July 19, 1966 F. LOUZIL ET AL 3,261,924

CORE HOLDER FOR OR IN MULTI-TRACK ERASING HEADS

Filed Aug. 31, 1960

INVENTOR
FRIEDRICH LOUZIL
ALFRED SVECENY
BY
[signature]
AGENT

United States Patent Office 3,261,924
Patented July 19, 1966

3,261,924

CORE HOLDER FOR OR IN MULTI-TRACK ERASING HEADS

Friedrich Louzil and Alfred Sveceny, Vienna, Austria, assignors to North American Philips Company, Inc., New York, N.Y., a corporation of Delaware Filed Aug. 31, 1960, Ser. No. 53,237
Claims priority, application Austria, Sept. 3, 1959, A 6,389/59
10 Claims. (Cl. 179—100.2)

Figure 1:
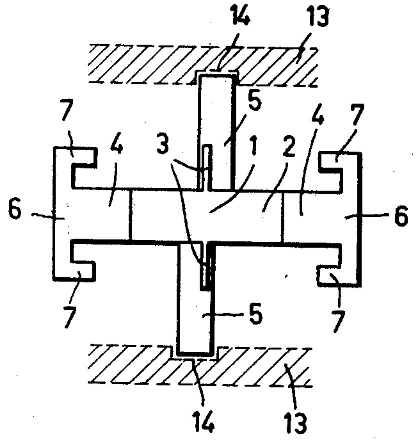

The invention relates to a core holder for multi-track magnetic heads provided with annular magnet cores having effective gaps filled by shims, the core holder being embedded together with the magnet core, coils, etc., in synthetic resin or the like.

The magnet core of the heads of magnetic recording and/or reproducing apparatus frequently has the form of a ring provided with an effective gap. In order to facilitate the mounting of the windings, the ring is usually made up from a number of core parts, generally from two parts. The effective gap is constituted at a joint by the insertion of a plate of non-magnetic material between the core parts, the thickness of which determines the length of the effective gap. Magnet core parts, shim, coils, windings, and terminals, such as soldering tags or the like, must be united to form the assembly termed the magnetic head, in which not only the separate components are completely fixed in their mutual positions but which also facilitates mounting thereof in the magnetic recording and/or reproducing apparatus. For this purpose many possibilities and resulting embodiments are known. However, a major advantage is obtained by provisionally assembling the head parts on a holder which is also embedded in a synthetic resin. Either the provisional assembly thus formed is placed in a special mould and then embedded in synthetic resin, the resulting synthetic resin block being removed from the mould which is available for further working, or the provisional assembly is inserted as a unit directly into a housing and embedded in synthetic resin therein.

Special requirements have to be satisfied by the design of a core holder if it is to be used for building a multi-track magnetic head. In such a head not only the distance by which the effective gaps are spaced from one another and which is determined by the track spacing, but also the relative positions of the effective gaps in the direction of movement of the tape must be maintained with a high degree of accuracy. In addition, the gap planes have to be accurately positioned with respect to the tape plane and to the direction of movement of the tape. Generally a vertical position is required. In erasing heads, however, the requirements to be satisfied by the gap length are not as stringent. This length may be from 0.1 to 0.2 mm. An essential requirement for the design of a core holder for or in multi-track heads is that it permits of preliminary mounting of the components without the need for special tools or measuring devices and provides an assembly in which the required tolerances are maintained not only in mounting but also during and after ultimately securing the components in their final positions.

Hence, according to the invention a core holder for multi-track erasing heads takes the form of a supporting frame which at its upper end has a cruciform structure constituted by spacing members extending parallel to the planes of the magnet cores and determining the track spacing of the magnetic cores engaging them, and by plate-shaped components extending at right angles to the spacing members and forming the shims. Preferably the spacing members are each divided into a part spacing the gap regions and a part spacing the opposite transverse portions of the magnet cores. It is of advantage for the spacing members engaged by the transverse portions of the magnet cores to be shaped so as to enable them to receive and secure the core parts, for example T-shaped, hooked or like projections. For joining the spacing members provision is made of a plate-shaped component which extends at right angles to these members and may act as a guide for the core holder which may either be inserted into a mould or directly into a housing. For easy handling the core holder has a specially shaped portion. Preferably, the core holder is made, by known methods, as an integral unit of synthetic resin material.

The core holder in accordance with the invention enables multi-track erasing heads to be manufactured with a high degree of accuracy without the need for special tools or devices. In particular there is no need of handling the shims which are small thin plates. A correct position of the effective gaps relative to one another and to the plane in which the tape moves is obtained automatically without any special adjustment. Furthermore, since the core holder is made of synthetic resin, it can be economically manufactured in great numbers with the required degree of accuracy.

The invention will now be described more fully with reference to the drawing which shows an embodiment of the invention. However, it is not intended that the invention be restricted thereto.

Figure 2:
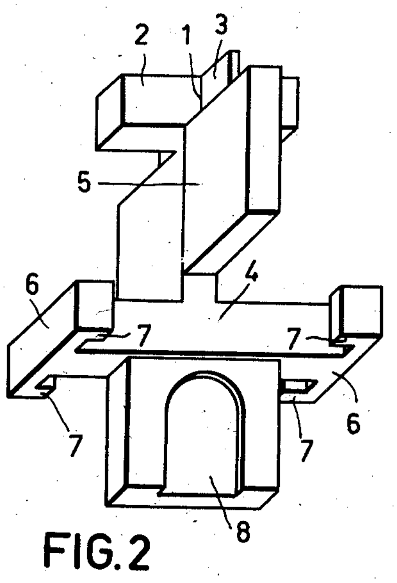
Figure 3:
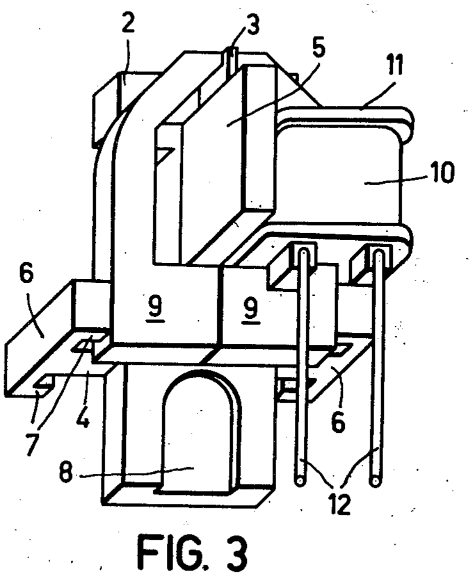

FIGURE 1 is a plan view of a core holder for an erasing head for four-track operation having parallel extending magnetic circuits and aligned effective gaps. FIGURE 2 is a perspective view thereof. FIGURE 3 shows a core holder as shown in FIGURE 2 on which a single head only is mounted for clarity.

At its upper end the core holder has a cruciform structure 1 comprising a spacer 2 and two plate-shaped or shim parts 3 extending at right angles thereto. A further spacer 4 extends parallel to the spacer 2 and since in the present case the planes of the magnetic cores extend parallel to one another, it has the same width as the spacer 2. The cross 1 and the spacer 4 are connected to one another by a plate 5 the two halves of which are offset with respect to one another. This offsetting is not necessary in every case. In the embodiment shown the offset serves only to increase the space for the windings. The spacer 4 is T-shaped at its ends by the provisions of cross bars 6. Each cross bar 6 is provided with two projections 7 directed inwards so that the spacer 4 has four hooks at its ends. Below the spacer 4 extends a plate-shaped part 8 which serves to support the holder during mounting etc.

Each magnetic circuit contains a known annular magnetic head consisting of C shaped core parts of ferrite material generally designated 9. The winding 10 of each magnetic circuit is accommodated on a coil former 11 having soldering tags 12. In the embodiment shown the coil is slipped onto one core half.

For mounting, an empty-core portion and a core portion provided with a coil are arranged so that their tooth-shaped ends are adjacent one side of the spacer 2 and separated by the plate-shaped or shim part 3 to form the effective gap. The transverse portions of the two magnetic core parts now must be mounted so as to engage the spacer 4. Since the hooks 7 are spaced by a distance slightly smaller than the sum of the lengths of the two transverse portions, they are stressed with a certain tension which is sufficient to fix the core portions and the coil provisionally to the core holder but permits of movement in the direction of the gap plane in order to enable the gap-forming ends of the core portions to be aligned with respect to the surface of the cross 1. Then the second magnet core is mounted on the other side of the spacers 2 and 4 in a similar manner. It may be desirable for a small amount of adhesive to be provided on the surfaces of the spacers 2 and 4 facing the magnet cores prior to mounting these cores.

In order to secure the components in their finel positions and to produce a magnetic head adapted to be mounted in a magnetic recording and/or reproducing apparatus the assembly constituted by the core holder and the components is placed, with the part containing the effective gaps preferably extending downwards, in a mould or in a housing 13 serving as a potting mould and indicated by shading in FIGURE 1. The handle 8 and the joining plate 5 perform valuable service if the mould or housing is provided with guiding means, for example guiding grooves 14, for their reception. After hardening, the surface forming the running surface for the tape and containing the gaps is ground to remove the potting resin as is well known.

Finally the invention is not restricted to a magnetic head for four-track operation having two parallel arranged magnetic circuits and aligned effective gaps. The essential character of the invention is not changed if the supporting frame at its upper end is provided not with a simple cross but with a multiple cross comprising a number of parallel extending spacers determining the track spacings of the magnet cores and a number of plate-shaped parts extending at right angles thereto and forming the shims. Such a core holder is adapted for use in a multiple-track erasing head.

If the magnetic circuits of the heads are not arranged parallel to one another and the effective gaps are not arranged in line with one another, the cruciform construction comprising spacers and plate-shaped parts naturally has to conform with the resulting requirements. In this event, the plate-shaped parts will not be arranged in line with one another nor must they extend in right angles to the spacers. The spacers may have correspondingly inclined sides or different widths if the planes of the magnet cores are inclined with respect to one another.

What is claimed is:

1. A multi-track magnetic head assembly comprising a plurality of magnetic head core parts, means supporting said core parts in operative relation, said means having a discrete cruciform structure at one end thereof, said structure extending both parallel to the planes of said core parts for determining the track spacing thereof and at right angles to said planes for defining gap shims for said core parts.

2. A multi-track magnetic head assembly comprising a plurality of magnetic head core parts and holder means supporting said core parts in operative relation, said holder means having a discrete cruciform portion at one end thereof, said cruciform portion defining spacer means extending parallel to the planes of said core parts and shim means at right angles to said spacer means intermediate the gap defining portion of said core parts, and corresponding spacer means remote from said first named spacer means and adjacent the transverse portions of said core parts for determining the track position of said core parts.

3. A multi-track magnetic head assembly comprising a plurality of magnetic head core parts and a synthetic resin core holder member supporting said core parts in operative relation, said member having a cruciform formation at one end thereof defining first spacer means extending parallel to the planes of said core parts and gap shim means at right angles to said spacer means defining the effective gap between said core parts; said member having a second spacer means remote from said first spacer means and adjacent the transverse portions of said core parts, said first and second spacer means determining the tracking position of said core parts, and means for urging said core parts toward each other.

4. An assembly according to claim 3 wherein said last named means for urging said core parts toward each other comprises a pair of opposed cross bars secured on said second spacer means transversely thereof and extending in a plane parallel to the plane of said shim means and spaced therefrom, the distance between opposed cross bars being less than the sum of the lengths of the transverse portions of said core parts.

5. An assembly according to claim 4 wherein said cross bars have projections engaging the transverse portions of said core parts and defining the said distance which is less than the sum of the lengths of said transverse portions of said core parts.

6. An assembly according to claim 3 with the addition of a pair of guide plates between said spacer means extending at right angles to said spacer means.

7. An assembly according to claim 6 wherein said pair of guide plates are offset.

8. An assembly according to claim 3 wherein said core holder member has a projection extending therefrom at its end remote from the cruciform formation for handling the core holder during assembly of the core parts and potting said assembly.

9. Apparatus for magnetic head assembly and manufacture comprising a non-magnetic member adapted to hold a plurality of magnetic head core parts in operative relation, said member having space defining means for determining the track spacing between said core parts, means at right angles to said space defining means to provide shim material between said core parts assembled on said member, and means adapted to urge said core parts toward one another.

10. A jig of non-magnetic material for assembling magnetic head core parts in the manufacture of multi-track magnetic heads comprising an elongated plate member, shoulder means adjacent the ends of said plate member defining surfaces adapted to engage said core parts and determine the track spacing between assembled magnetic heads, shim means at one end of said plate member and integral therewith, and means operatively associated with said plate member for urging said core parts assembled on said jig against said shim means.

References Cited by the Examiner

UNITED STATES PATENTS

| | | | |
|---|---|---|---|
| 2,621,259 | 12/1952 | Grantham | 179—100.2 |
| 2,835,743 | 5/1958 | Muffley | 130—741.1 |
| 2,941,045 | 6/1960 | Connel | 179—100.2 |
| 2,947,592 | 8/1960 | Naiman | 179—100.2 |

BERNARD KONICK, *Primary Examiner.*

NEWTON N. LOVEWELL, IRVING L. SRAGOW, *Examiners.*

D. G. REDINBAUGH, J. R. GOUDEAU, *Assistant Examiners.*